United States Patent
Wang et al.

(10) Patent No.: US 11,606,155 B2
(45) Date of Patent: *Mar. 14, 2023

(54) METHOD FOR EXCHANGING TIME SYNCHRONIZATION PACKET AND NETWORK APPARATUS

(71) Applicant: HUAWEI TECHNOLOGIES CO., LTD., Shenzhen (CN)

(72) Inventors: Jinhui Wang, Dongguan (CN); Chuan Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,108

(22) Filed: Jul. 13, 2021

(65) Prior Publication Data

US 2021/0344435 A1 Nov. 4, 2021

Related U.S. Application Data

(63) Continuation of application No. 16/455,721, filed on Jun. 27, 2019, now Pat. No. 11,095,383, which is a
(Continued)

(51) Int. Cl.
*H04J 3/06* (2006.01)
*H04W 56/00* (2009.01)

(52) U.S. Cl.
CPC ............ *H04J 3/065* (2013.01); *H04J 3/0655* (2013.01); *H04J 3/0661* (2013.01); *H04W 56/001* (2013.01)

(58) Field of Classification Search
CPC ........ H04J 3/065; H04J 3/0655; H04J 3/0661; H04J 3/0667; H04J 3/0673; H04W 56/001
See application file for complete search history.

(56) References Cited

U.S. PATENT DOCUMENTS

| 7,447,931 B1 | 11/2008 | Rischar et al. |
| 8,976,778 B2 | 3/2015 | Bedrosian |

(Continued)

FOREIGN PATENT DOCUMENTS

| CN | 101496322 A | 7/2009 |
| CN | 101834712 A | 9/2010 |

(Continued)

OTHER PUBLICATIONS

Zhou Feng et al., "Embedded IEEE 1588 Precision Clock Synchronization Achieved", (School of Electrical Engineering and Automation, Tianjin University, Tianjin 300072), Issue 4, 2013, Total 4 pages with an English Abstract.
(Continued)

*Primary Examiner* — Deepa Belur
(74) *Attorney, Agent, or Firm* — Maier & Maier, PLLC

(57) ABSTRACT

A method for exchanging a clock synchronization packet performed by a network apparatus, including: exchanging a clock synchronization packet with a first clock source, where the network apparatus includes a boundary clock; determining a first time deviation of the boundary clock relative to the first clock source according to the clock synchronization packet exchanged with the first clock source, where the boundary clock avoids performing an operation of calibrating a time of a local clock of the boundary clock according to the first time deviation; and sending a clock synchronization packet to a first slave clock of the boundary clock, where the clock synchronization packet includes a first timestamp, a value of the first timestamp is equal to a first corrected value, and the first corrected value is a value obtained by the boundary clock by correcting the time of the local clock by using the first time deviation.

20 Claims, 5 Drawing Sheets

Related U.S. Application Data continuation of application No. PCT/CN2016/113847, filed on Dec. 30, 2016.

(56) References Cited

U.S. PATENT DOCUMENTS

| | | | |
|---|---|---|---|
| 2008/0025344 | A1 | 1/2008 | Biederman et al. |
| 2012/0250704 | A1* | 10/2012 | Yamada ............... H04L 43/106 370/503 |
| 2013/0227172 | A1 | 8/2013 | Zheng et al. |
| 2014/0281037 | A1 | 9/2014 | Spada et al. |
| 2015/0085852 | A1* | 3/2015 | Mizutani ............ H04L 43/0852 370/350 |
| 2015/0156262 | A1 | 6/2015 | Alves et al. |
| 2015/0222413 | A1* | 8/2015 | Pietilainen ........... H04L 7/0012 709/248 |
| 2015/0229587 | A1* | 8/2015 | Ma ..................... H04L 49/3009 370/419 |
| 2016/0127118 | A1 | 5/2016 | Yun et al. |
| 2016/0170439 | A1 | 6/2016 | Smith et al. |
| 2017/0063985 | A1 | 3/2017 | Xun |
| 2017/0214479 | A1* | 7/2017 | Heine .................. H04J 3/0667 |
| 2018/0262287 | A1 | 9/2018 | Han et al. |

FOREIGN PATENT DOCUMENTS

| | | | | |
|---|---|---|---|---|
| CN | 101895384 | A | | 11/2010 |
| CN | 102833062 | A | | 12/2012 |
| CN | 103312428 | A | | 9/2013 |
| CN | 103378916 | A | | 10/2013 |
| CN | 104145435 | A | | 11/2014 |
| CN | 105027489 | A | | 11/2015 |
| CN | 105763641 | A | | 7/2016 |
| CN | 105846937 | A | | 8/2016 |
| CN | 112636884 | A * | 4/2021 | ........... H04L 5/0048 |
| CN | 113727429 | A * | 11/2021 | |
| EP | 2541815 | A1 | | 1/2013 |
| JP | 2019213014 | A * | 12/2019 | |
| WO | 2011029310 | A1 | | 3/2011 |

OTHER PUBLICATIONS

Michel Ouellette et al., "Using IEEE 1588 and Boundary Clocks for Clock Synchronization in Telecom Networks", IEEE Communications Magazine, Feb. 2011; 8 pages.

Nylund et al., "IEEE 1588 Ethernet switch Transparency—No need for Boundary Clocks!" Internet Citation, Oct. 13, 2004, pp. 1-4, XP002663682.

IEEE Std 1588 TM-2008. IEEE Standard for a Precision Clock Synchronization Protocol for Networked Measurement and Control Systems, IEEE Instrumentation and Measurement Society, Sponsored by the Technical Committee on Sensor Technology (TC-9). Jul. 24, 2008, 289 pages.

ITU-T G.8271.1/Y.1366.1, Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet Protocol aspects—Transport Timing Characteristics of telecom boundary clocks and telecom timeslave clocks. Aug. 2015, 22 pages.

ITU-T G.8273.2/Y.1368.2, Amendment 2, Series G: Transmission Systems and Media, Digital Systems and Networks, Packet over Transport aspects—Synchronization, quality and availability targets, Series Y:Global Information Infrastructure, Internet Protocol Aspects and Next-Generation Networks, Internet Protocol aspects—Transport Network limits for time synchronization in packet networks, Aug. 2013, 38 pages.

ITU-T G.8275.1/Y.1369.1, Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet Protocol aspects—Transport Precision time protocol telecom profile for phase/time synchronization with full timing support from the network. Jun. 2016, 56 pages.

* cited by examiner

A network apparatus exchanges a clock synchronization packet with a first clock source by using a first slave port
S301

The network apparatus determines a first time deviation of a boundary clock relative to the first clock source according to the clock synchronization packet exchanged with the first clock source
S302

The network apparatus sends a clock synchronization packet to a first slave clock of the boundary clock by using a first master port
S303

FIG. 3

METHOD FOR EXCHANGING TIME SYNCHRONIZATION PACKET AND NETWORK APPARATUS

CROSS-REFERENCE TO RELATED APPLICATIONS

This application is a continuation of U.S. patent application Ser. No. 16/455,721, filed on Jun. 27, 2019, which is a continuation of International Application No. PCT/CN2016/113847, filed on Dec. 30, 2016. Both of the aforementioned applications are hereby incorporated by reference in their entireties.

TECHNICAL FIELD

Embodiments of the present invention relate to the field of communications technologies, and in particular, to a method for exchanging a time synchronization packet and a network apparatus.

BACKGROUND

A clock synchronization network may include multiple network apparatuses. For example, a clock synchronization network based on the IEEE1588-2008 issued by the Institute of Electrical and Electronics Engineers (IEEE) may include a transparent clock (TC), a boundary clock (BC), and an ordinary clock (OC). For example, the BC is a network apparatus of the clock synchronization network. Before the BC calibrates a time and a frequency of a local clock of a target device, the BC needs to calibrate a time and a frequency of a local clock of the BC according to a clock source. When the BC calibrates the time and the frequency of the local clock of the BC according to the clock source, the clock source functions as a master clock (MC), and the BC functions as a slave clock (SC). When the BC calibrates the time and the frequency of the local clock of the target device, the BC functions as a master clock, and the target device functions as a slave clock.

Before a network apparatus calibrates a time or a frequency of a target device, the network apparatus needs to calibrate a time or a frequency of the network apparatus according to a clock source. This implementation is not flexible enough, and limits an application scenario of the network apparatus.

SUMMARY

Embodiments of the present invention provide a method for exchanging a time synchronization packet and a network apparatus, to help extend an application scenario of the network apparatus.

According to a first aspect, a method for exchanging a time synchronization packet is provided, including:

exchanging, by a network apparatus, a clock synchronization packet with a first clock source by using a first slave port, where the network apparatus includes a BC, and the BC includes the first slave port and a first master port;

determining, by the network apparatus, a first time deviation of the BC relative to the first clock source according to the clock synchronization packet exchanged with the first clock source, where the BC avoids performing an operation of calibrating a time of a local clock of the BC according to the first time deviation; and sending, by the network apparatus, a clock synchronization packet to a first slave clock of the BC by using the first master port, where the clock synchronization packet sent by the network apparatus to the first slave clock includes a first timestamp generated by the BC, a value of the first timestamp is equal to a first corrected value, and the first corrected value is a value obtained by the BC by correcting a time t1 of the local clock by using the first time deviation, where the time t1 is a time at which the BC generates the first timestamp.

In the foregoing technical solution, before the network apparatus is used as a master clock to send a time synchronization packet to a target device, the network apparatus does not need to calibrate a time or a frequency of the network apparatus according to a clock source. An implementation of the network apparatus is relatively flexible, helping extend an application scenario of the network apparatus.

Optionally, in the foregoing technical solution, after the exchanging, by a network apparatus, a clock synchronization packet with a first clock source by using a first slave port, and before the sending, by the network apparatus, a clock synchronization packet to a first slave clock of the BC by using the first master port, the method further includes:

determining, by the network apparatus, a first frequency deviation of the BC relative to the first clock source according to the clock synchronization packet exchanged with the first clock source, where the BC avoids performing an operation of calibrating a frequency of the local clock of the BC according to the first frequency deviation, and the first corrected value is a value obtained by the BC by correcting t1 by using the first time deviation and the first frequency deviation.

Optionally, in the foregoing technical solution, the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the BC generates the first timestamp.

Optionally, in the foregoing technical solution, the method further includes:

exchanging, by the network apparatus, a clock synchronization packet with a second clock source by using a second slave port, where the BC includes the second slave port and a second master port;

determining, by the network apparatus, a second time deviation of the BC relative to the second clock source according to the clock synchronization packet exchanged with the second clock source, where the BC avoids performing an operation of calibrating the time of the local clock of the BC according to the second time deviation; and sending, by the network apparatus, a clock synchronization packet to a second slave clock of the BC by using the second master port, where the clock synchronization packet sent by the network apparatus to the second slave clock includes a second timestamp generated by the BC, a value of the second timestamp is equal to a second corrected value, and the second corrected value is a value obtained by correcting a time t2 of the local clock by using the second time deviation, where the time t2 is a time at which the BC generates the second timestamp.

Optionally, in the foregoing technical solution, after the exchanging, by the network apparatus, a clock synchronization packet with a second clock source by using a second slave port, and before the sending, by the network apparatus, a clock synchronization packet to a second slave clock of the BC by using the second master port, the method further includes:

determining, by the network apparatus, a second frequency deviation of the BC relative to the second clock source according to the clock synchronization packet exchanged with the second clock source, where the BC avoids performing an operation of calibrating the frequency of the local clock of the BC according to the second frequency deviation, and the second corrected value is a value obtained by the BC by correcting t2 by using the second time deviation and the second frequency deviation.

Optionally, in the foregoing technical solution, the second corrected value is equal to a sum of t2, the second time deviation, and a second phase deviation, and the second phase deviation is a phase deviation that is of the local clock relative to the second clock source and that is caused by the second frequency deviation within duration from a time at which the local clock determines the second frequency deviation to the time at which the BC generates the second timestamp.

According to a second aspect, a network apparatus is provided, including:

an interaction unit, configured to exchange a clock synchronization packet with a first clock source by using a first slave port, where the network apparatus includes a boundary clock BC, and the BC includes the first slave port and a first master port;

a determining unit, configured to determine a first time deviation of the BC relative to the first clock source according to the clock synchronization packet exchanged with the first clock source, where the BC avoids performing an operation of calibrating a time of a local clock of the BC according to the first time deviation; and a sending unit, configured to send a clock synchronization packet to a first slave clock of the BC by using the first master port, where the clock synchronization packet sent by the network apparatus to the first slave clock includes a first timestamp generated by the BC, a value of the first timestamp is equal to a first corrected value, and the first corrected value is a value obtained by the BC by correcting a time t1 of the local clock by using the first time deviation, where the time t1 is a time at which the BC generates the first timestamp.

In the foregoing technical solution, before the network apparatus is used as a master clock to send a time synchronization packet to a target device, the network apparatus does not need to calibrate a time or a frequency of the network apparatus according to a clock source. An implementation of the network apparatus is relatively flexible, helping extend an application scenario of the network apparatus.

Optionally, in the foregoing technical solution, the determining unit is further configured to:

after the interaction unit exchanges the clock synchronization packet with the first clock source by using the first slave port, and before the sending unit sends the clock synchronization packet to the first slave clock of the BC by using the first master port, determine a first frequency deviation of the BC relative to the first clock source according to the clock synchronization packet exchanged with the first clock source, where the BC avoids performing an operation of calibrating a frequency of the local clock of the BC according to the first frequency deviation, and the first corrected value is a value obtained by the BC by correcting t1 by using the first time deviation and the first frequency deviation.

Optionally, in the foregoing technical solution, the interaction unit is further configured to exchange a clock synchronization packet with a second clock source by using a second slave port, where the BC includes the second slave port and a second master port;

the determining unit is further configured to determine a second time deviation of the BC relative to the second clock source according to the clock synchronization packet exchanged with the second clock source, where the BC avoids performing an operation of calibrating the time of the local clock of the BC according to the second time deviation; and the sending unit is further configured to send a clock synchronization packet to a second slave clock of the BC by using the second master port, where the clock synchronization packet sent by the network apparatus to the second slave clock includes a second timestamp generated by the BC, a value of the second timestamp is equal to a second corrected value, and the second corrected value is a value obtained by correcting a time t2 of the local clock by using the second time deviation, where the time t2 is a time at which the BC generates the second timestamp.

Optionally, in the foregoing technical solution, the determining unit is further configured to:

after the interaction unit exchanges the clock synchronization packet with the second clock source by using the second slave port, and before the sending unit sends the clock synchronization packet to the second slave clock of the BC by using the second master port, determine a second frequency deviation of the BC relative to the second clock source according to the clock synchronization packet exchanged with the second clock source, where the BC avoids performing an operation of calibrating the frequency of the local clock of the BC according to the second frequency deviation, and the second corrected value is a value obtained by the BC by correcting t2 by using the second time deviation and the second frequency deviation.

According to a third aspect, a method for exchanging a clock synchronization packet is provided, including:

exchanging, by a network apparatus, a clock synchronization packet with a first clock source;

exchanging, by the network apparatus, a clock synchronization packet with a second clock source;

after the network apparatus exchanges the clock synchronization packet with the first clock source and after the network apparatus exchanges the clock synchronization packet with the second clock source, sending, by the network apparatus, a first clock synchronization packet to a first slave clock of the network apparatus, where the first clock synchronization packet carries a first timestamp generated by the network apparatus, and a time indicated by the first timestamp is equal to a time that is of the first clock source and at which the network apparatus sends the first clock synchronization packet; and after the network apparatus exchanges the clock synchronization packet with the first clock source and after the network apparatus exchanges the clock synchronization packet with the second clock source, sending, by the network apparatus, a second clock synchronization packet to a second slave clock of the network apparatus, where the first clock synchronization packet carries a second timestamp generated by the network apparatus, and a time indicated by the second timestamp is equal to a time that is of the second clock source and at which the network apparatus sends the second clock synchronization packet.

In the foregoing technical solution, the network apparatus may transfer clock signals of multiple clock domains to a slave clock of the network apparatus, thereby helping extend an application scenario of the network apparatus.

Optionally, in the foregoing technical solution, a value of the first timestamp is determined in the following manner:

after the network apparatus exchanges the clock synchronization packet with the first clock source, determining, by the network apparatus, a first time deviation of the network apparatus relative to the first clock source according to the clock synchronization packet exchanged with the first clock source, where the network apparatus avoids performing an operation of calibrating a time of a local clock of the network apparatus according to the first time deviation; and determining, by the network apparatus, that the value of the first timestamp is equal to a first corrected value, where the first corrected value is a value obtained by the network apparatus by correcting a time t1 of the local clock by using the first time deviation, where the time t1 is a time at which the network apparatus generates the first timestamp.

Optionally, in the foregoing technical solution, the value of the first timestamp is specifically determined in the following manner:

after the network apparatus exchanges the clock synchronization packet with the first clock source, determining, by the network apparatus, a first frequency deviation of the network apparatus relative to the first clock source according to the clock synchronization packet exchanged with the first clock source, where the network apparatus avoids performing an operation of calibrating a frequency of the local clock according to the first frequency deviation; and determining, by the network apparatus, that the value of the first timestamp is equal to the first corrected value, where the first corrected value is a value obtained by the network apparatus by correcting t1 by using the first time deviation and the first frequency deviation.

Optionally, in the foregoing technical solution, the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the network apparatus generates the first timestamp.

According to a fourth aspect, a network apparatus is provided, including:

a first interaction unit, configured to exchange a clock synchronization packet with a first clock source;

a second interaction unit, configured to exchange a clock synchronization packet with a second clock source;

a first sending unit, configured to: after the first interaction unit exchanges the clock synchronization packet with the first clock source and after the second interaction unit exchanges the clock synchronization packet with the second clock source, send a first clock synchronization packet to a first slave clock of the network apparatus, where the first clock synchronization packet carries a first timestamp generated by the network apparatus, and a time indicated by the first timestamp is equal to a time that is of the first clock source and at which the network apparatus sends the first clock synchronization packet; and a second sending unit, configured to: after the first interaction unit exchanges the clock synchronization packet with the first clock source and after the second interaction unit exchanges the clock synchronization packet with the second clock source, send a second clock synchronization packet to a second slave clock of the network apparatus, where the first clock synchronization packet carries a second timestamp generated by the network apparatus, and a time indicated by the second timestamp is equal to a time that is of the second clock source and at which the network apparatus sends the second clock synchronization packet.

In the foregoing technical solution, the network apparatus may transfer clock signals of multiple clock domains to a slave clock of the network apparatus, thereby helping extend an application scenario of the network apparatus.

Optionally, in the foregoing technical solution, the network apparatus further includes a determining unit, where the determining unit is configured to: after the first interaction unit exchanges the clock synchronization packet with the first clock source, determine a first time deviation of the network apparatus relative to the first clock source according to the clock synchronization packet exchanged with the first clock source, where the network apparatus avoids performing an operation of calibrating a time of a local clock of the network apparatus according to the first time deviation; and the determining unit is further configured to determine that a value of the first timestamp is equal to a first corrected value, where the first corrected value is a value obtained by the network apparatus by correcting a time t1 of the local clock by using the first time deviation, where the time t1 is a time at which the network apparatus generates the first timestamp.

Optionally, in the foregoing technical solution, the determining unit is further configured to: after the first interaction unit exchanges the clock synchronization packet with the first clock source, determine a first frequency deviation of the network apparatus relative to the first clock source according to the clock synchronization packet exchanged with the first clock source, where the network apparatus avoids performing an operation of calibrating a frequency of the local clock according to the first frequency deviation, and the first corrected value is a value obtained by the network apparatus by correcting t1 by using the first time deviation and the first frequency deviation.

Optionally, in the foregoing technical solution, the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the network apparatus generates the first timestamp.

According to a fifth aspect, a system is provided. The system includes a network apparatus, a first clock source, and a first slave clock. The network apparatus in the system is the network apparatus provided in the second aspect. The first clock source in the system is the first clock source mentioned in the second aspect. The first slave clock in the system is the first slave clock mentioned in the second aspect.

Optionally, in the technical solutions provided in the first to the fifth aspects, the network apparatus specifically determines the first time deviation or the second time deviation according to the IEEE1588-2008.

Optionally, in the technical solutions provided in the first to the fifth aspects, the network apparatus specifically determines the first time deviation and the second time deviation according to the IEEE1588-2008.

Optionally, in the technical solutions provided in the first to the fifth aspects, the network apparatus specifically determines the first frequency deviation or the second frequency deviation according to the IEEE1588-2008.

Optionally, in the technical solutions provided in the first to the fifth aspects, the network apparatus specifically determines the first frequency deviation and the second frequency deviation according to the IEEE1588-2008.

Optionally, in the technical solutions provided in the first to the fifth aspects, the first slave clock calibrates a time of the first slave clock and/or a frequency of the first slave clock according to the time synchronization packet sent by the network apparatus to the first slave clock.

Optionally, in the technical solutions provided in the first to the fifth aspects, the second slave clock calibrates a time of the second slave clock and/or a frequency of the second slave clock according to the time synchronization packet sent by the network apparatus to the second slave clock.

Optionally, in the technical solutions provided in the first to the fifth aspects, before the network apparatus exchanges the clock synchronization packet with the first clock source, the network apparatus calibrates the time and/or the frequency of the boundary clock according to a BITS clock.

Optionally, in the technical solutions provided in the first to the fifth aspects, before the network apparatus exchanges the clock synchronization packet with the second clock source, the network apparatus calibrates the time and/or the frequency of the boundary clock according to a BITS clock.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description merely show some embodiments of this application, and a person of ordinary skill in the art can derive other drawings from these accompanying drawings without creative efforts.

FIG. 3 is a schematic flowchart of a method according to an embodiment;

DESCRIPTION OF EMBODIMENTS

Figure 1:
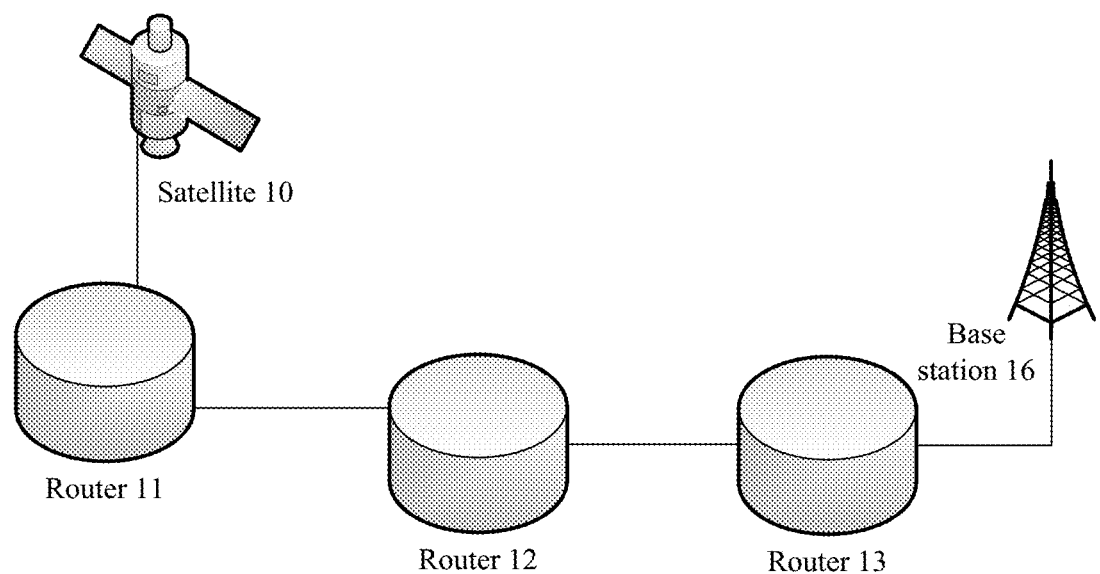
FIG. 1 is a schematic diagram of a clock synchronization network according to an embodiment.

The following describes the technical solutions in the embodiments of the present invention with reference to the accompanying drawings in the embodiments of the present invention.

In the embodiments, a local clock of a network apparatus is a clock included in the network apparatus. The clock is capable of performing a timing function. For example, the clock may include a crystal oscillator and a counter. The counter may be specifically an accumulator. The counter may include a memory. A value stored in the memory is equal to a current time recorded by the clock. The crystal oscillator may output, in each working cycle, a pulse signal to the counter. When the counter detects a rising edge or a falling edge of the pulse signal, the counter performs an addition operation on an increment and the value stored in the memory, so as to update the value stored in the memory. The increment is equal to a nominal working cycle of the crystal oscillator. For example, a nominal working frequency of the crystal oscillator may be 125 Mega Hertz (MHz). Correspondingly, the nominal working cycle of the crystal oscillator may be 8 nanoseconds. At a time, the clock may have a time deviation and a frequency deviation relative to a clock source. After specified duration, the current time recorded by the clock may be not accurate enough. Both the time deviation and the frequency deviation may cause the current time to be not accurate enough. The following describes a case in which the current time is not accurate enough due to the frequency deviation: A deviation exists between the nominal working cycle of the crystal oscillator and an actual working cycle of the crystal oscillator, and after the counter updates the value stored in the memory, the current time recorded by the clock may be not accurate enough. The following describes a case in which the current time is not accurate enough due to the time deviation: Before the counter updates the value stored in the memory, the value stored in the memory may not be accurate enough. As a result, the current time recorded by the clock is not accurate enough after the counter updates the value stored in the memory.

The network apparatus including the clock may perform another function by using the timing function provided by the local clock of the network apparatus. For example, when the network apparatus sends a packet to another network apparatus, the network apparatus may add a timestamp to the to-be-sent packet. The added timestamp is used to indicate a sending time of the packet. A value of the added timestamp may be equal to the current time recorded by the local clock. For another example, when the network apparatus receives a packet sent by another network apparatus, the network apparatus may add a timestamp to the received packet. The added timestamp is used to indicate a receiving time of the packet. A value of the added timestamp may be equal to the current time recorded by the local clock.

It may be understood that each network apparatus may include its own local clock. Local clocks included in different network apparatuses may have different precision. In addition, a clock with relatively high precision in a network apparatus may be used as a master clock to calibrate a clock with relatively low precision in a network apparatus. The calibrated clock of the network apparatus functions as a slave clock. For example, a clock of a network apparatus may be used to calibrate a clock of another network apparatus according to the IEEE1588-2008.

In the embodiments, a physical layer device (PHY device) is a circuit configured to implement a function of a physical layer defined in the Ethernet protocol. For example, the physical layer may include a physical coding sublayer (PCS). In addition, the PHY device may perform functions of generating a timestamp and adding the timestamp to a clock synchronization packet. The PHY device may include a circuit configured to perform a function defined in the IEEE1588-2008. For example, when the PHY device receives a clock synchronization packet, the PHY device may generate, according to a current time of a network apparatus on which the PHY device is located, a timestamp used to indicate a receiving time of the clock synchronization packet, and add the timestamp to the clock synchronization packet. For an Ethernet port, the physical layer, and the PCS, refer to a description in the Ethernet protocol. The Ethernet protocol may be the IEEE 802.3ab.

FIG. 1 is a schematic diagram of a clock synchronization network according to an embodiment. The clock synchronization network includes a satellite 10, a router 11, a router 12, a router 13, and a base station 16. The satellite 10 may be a GPS satellite. The router 11 may be a provider router. The router 12 may be a provider edge router. The router 13 may be a customer edge router. The router 11, the router 12, and the router 13 may provide a virtual private network (VPN) service. For example, the VPN service may be a layer 2 virtual private network (L2VPN) service. It may be understood that, when the router 11, the router 12, and the router 13 provide the L2VPN service, another network element not shown in FIG. 1 is further included, for example, a host. The host may be a laptop computer or a desktop computer. The base station 15 is a network element in a cellular network. For example, the base station 16 may be a Node B. The base station 16 may provide a radio access service. It may be understood that, when the base station 16 provides the radio access service, another network element not shown in FIG. 1 is further included, for example, user equipment (UE). The user equipment may be a cellular phone.

The satellite 10 may perform a clock synchronization operation on the router 11. Specifically, the router 11 may include a Global Positioning System (GPS) receiver and a clock. The satellite 10 may be a GPS satellite. The satellite 10 may include an atomic clock. Driven by the atomic clock, the satellite 10 may send a GPS signal to the router 11. The GPS signal may include time data whose precision is the same as that of the atomic clock. After receiving the GPS signal, the GPS receiver in the router 11 may synchronize the clock of the router 11 to the atomic clock of the GPS satellite according to the time data in the GPS signal. Specifically, a time of the clock of the router 11 is synchronized to a time of the atomic clock of the GPS satellite. In addition, a frequency of the clock of the router 11 is synchronized to a frequency of the atomic clock of the GPS satellite. In the foregoing process, the GPS satellite functions as a master clock, and the router 11 functions as a slave clock. In another implementation, the network shown in FIG. 1 may further include a primary reference time clock (PRTC). The PRTC is coupled to the router 11. The satellite 10 may perform a clock synchronization operation on the PRTC to calibrate a time and a frequency of the PRTC. After the time and the frequency of the PRTC are calibrated, the time and the frequency of the clock of the router 11 may be calibrated based on the IEEE1588-2008. The PRTC and the router 11 are devices compliant with the IEEE1588-2008. After the clock of the router 11 is calibrated, the router 11 may be used as a grandmaster clock to calibrate a time of another device.

After the clock of the router 11 is calibrated, the router 11 may be used as a clock source of another device. Specifically, the router 11 may be used as a master clock to calibrate a clock of the another device. For example, both the router 11 and the router 12 may be devices compliant with the IEEE1588-2008. The router 11 may calibrate, based on the IEEE1588-2008, a time and frequency of a clock of the router 12. Similarly, the router 12 may be used as a master clock to calibrate a clock of the router 13. The router 13 may be used as a master clock to calibrate a clock of the base station 16. In the foregoing process, the router 12 may be considered as a clock source of the router 13.

In the foregoing solution, the router 11, the router 12, and the router 13 are located in a fixed network. The base station 16 is located in the cellular network. The router 13 may be at an edge of the fixed network. The router 13 may be a boundary clock. Before the router 13 calibrates a time and a frequency of the local clock of the base station 16, the router 13 needs to calibrate a time and a frequency of the clock of the router 13 according to the router 12 that is used as the clock source.

Figure 2:
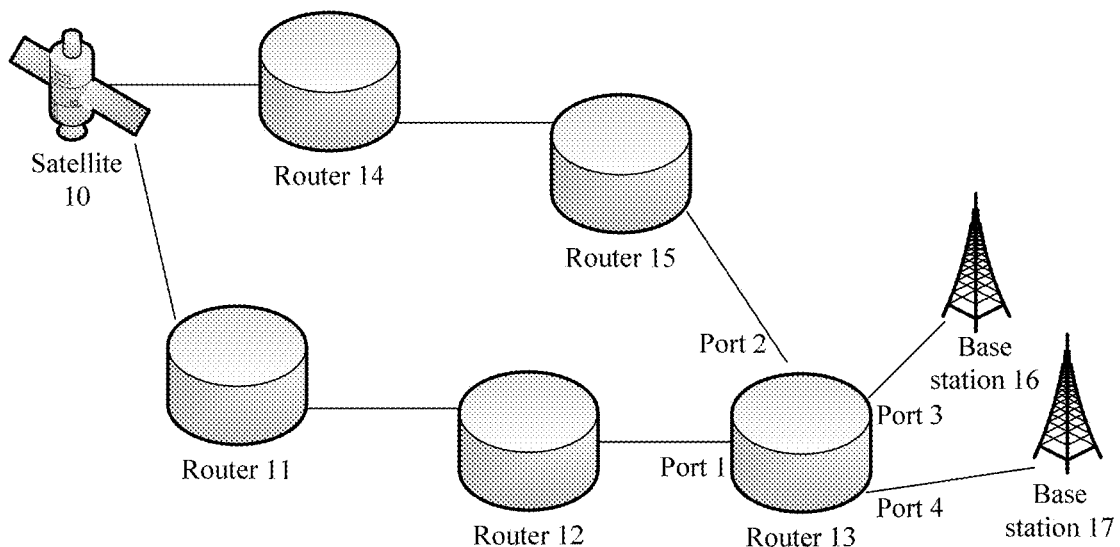
FIG. 2 is a schematic diagram of a clock synchronization network according to an embodiment.

FIG. 2 is a schematic diagram of a clock synchronization network according to an embodiment. A technical solution shown in FIG. 2 may be obtained by means of extension based on the clock synchronization network shown in FIG. 1. For content not mentioned in this embodiment, refer to the description of the embodiment corresponding to FIG. 1. The following mainly describes a difference between the technical solution shown in FIG. 2 and the technical solution shown in FIG. 1. The clock synchronization network shown in FIG. 2 includes a satellite 10, a router 11, a router 12, a router 13, a router 14, a router 15, a base station 16, and a base station 17. Compared with FIG. 1, the clock synchronization network shown in FIG. 2 further includes the router 14, the router 15, and the base station 17. The router 14 may be a provider router. The router 15 may be a provider edge router. The base station 17 is a network element in a cellular network.

The satellite 10 may perform a clock synchronization operation on the router 14. For a process of performing the clock synchronization operation on the router 14 by the satellite 10, refer to the foregoing description about performing the clock synchronization operation on the router 11 by the satellite 10. Details are not described herein again. It should be noted that the router 14 may be coupled to a PRTC. A PRTC coupled to the router 11 and the PRTC coupled to the router 14 may not be a same PRTC, or may be a same PRTC. The satellite 10 may perform a clock synchronization operation on the PRTC coupled to the router 14, to calibrate a time and a frequency of the PRTC coupled to the router 14. After the time and the frequency of the PRTC coupled to the router 14 are calibrated, the PRTC coupled to the router 14 may calibrate, based on the IEEE1588-2008, a time and a frequency of a clock of the router 14. The PRTC coupled to the router 14 and the router 14 are devices compliant with the IEEE1588-2008. After the clock of the router 14 is calibrated, the router 14 may be used as a grandmaster clock to calibrate a time of another device. For example, the router 14 may calibrate, based on the IEEE1588-2008, a time and a frequency of a clock of the router 15.

According to FIG. 2, the router 13 and the router 12 are coupled. The router 13 and the router 15 are coupled. The router 13 and the base station 16 are coupled. The router 13 and the base station 17 are coupled. Specifically, the router 13 includes a port 1, a port 2, a port 3, and a port 4. All of the port 1, the port 2, the port 3, and the port 4 may be Ethernet ports. The Ethernet port may be compliant with the IEEE 802.3ab protocol. The router 13 may be coupled to the router 12 by using the port 1. The router 13 may be coupled to the router 15 by using the port 2. The router 13 may be coupled to the base station 16 by using the port 3. The router 13 may be coupled to the base station 17 by using the port 4. The router 13 has two clock sources. One clock source is the router 12, and the other clock source is the router 15.

Different from the solution shown in FIG. 1, although the router 13 also exchanges a time synchronization packet with the router 12, the router 13 does not calibrate a time and a frequency of a local clock of the router 13 according to the time synchronization packet exchanged with the router 12. In addition, the router 13 may determine a time deviation and a frequency deviation of the router 13 relative to the router 12 according to the time synchronization packet exchanged with the router 12. The router 13 may generate, according to the time of the local clock of the router 13 and the determined time deviation and frequency deviation, a clock signal (timestamp) that has same precision as that generated by the router 12. The router 13 adds the timestamp to a clock synchronization packet, and sends the clock synchronization packet to the base station 16. Then, the router 13 may calibrate a local clock of the base station 16. For the foregoing process, refer to a description in an embodiment corresponding to FIG. 3.

Similarly, the router 13 exchanges a time synchronization packet with the router 15, but the router 13 does not calibrate the time and the frequency of the local clock of the router 13 according to the time synchronization packet exchanged with the router 15. In addition, the router 13 may determine a time deviation and a frequency deviation of the router 13 relative to the router 15 according to the time synchronization packet exchanged with the router 15. The router 13 may generate, according to the time of the local clock of the router 13 and the determined time deviation and frequency deviation, a clock signal (timestamp) that has same precision as that generated by the router 15. The router 13 adds the timestamp to a clock synchronization packet, and sends the clock synchronization packet to the base station 17. Then, the router 13 may calibrate a local clock of the base station 17. For the foregoing process, refer to a description in the embodiment corresponding to FIG. 3.

Figure 4:
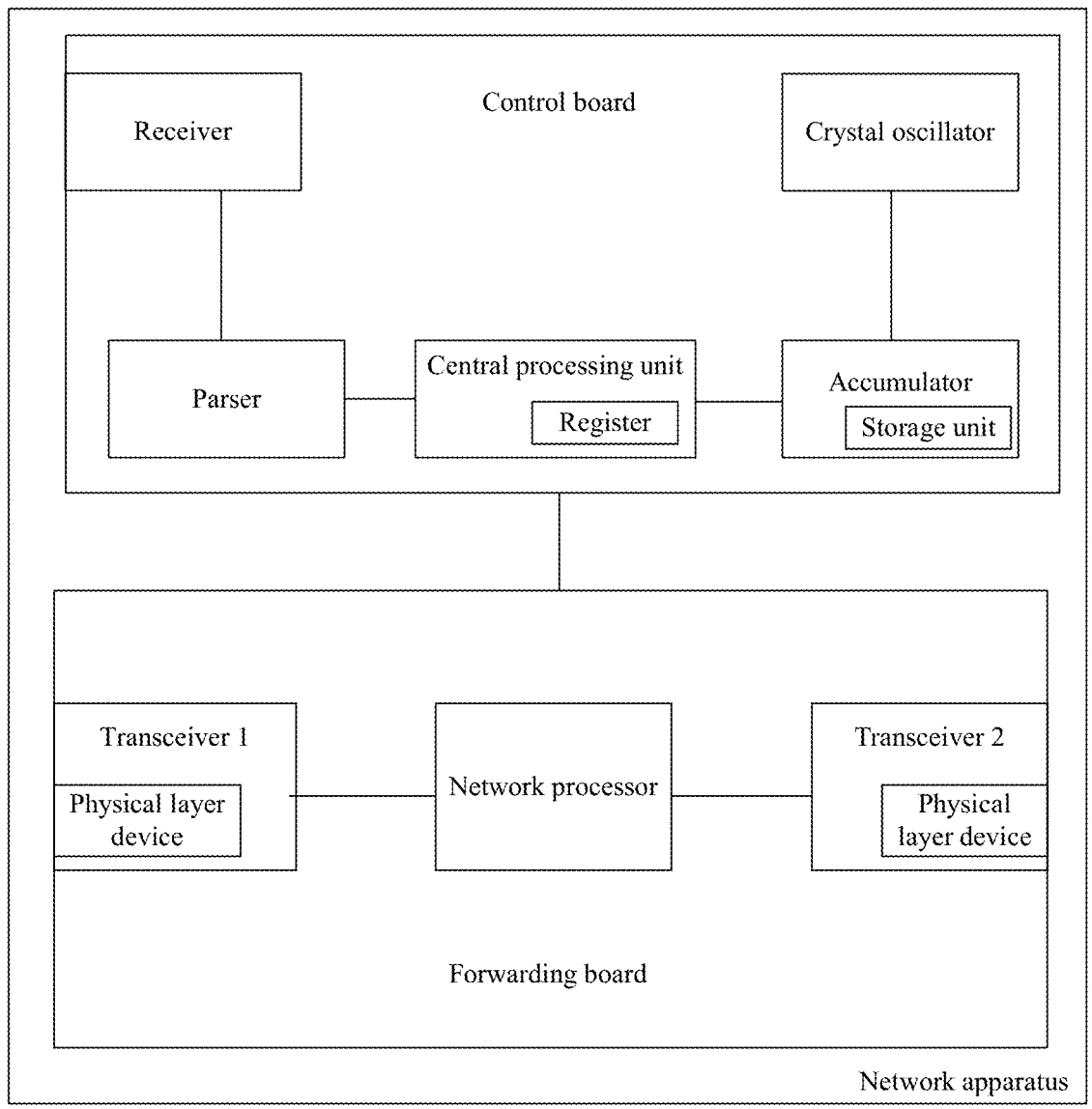
FIG. 4 is a schematic structural diagram of a network apparatus according to an embodiment.

FIG. 3 is a schematic flowchart of a method according to an embodiment. The method includes S301, S302, and S303. The method shown in FIG. 3 is performed by a network apparatus. The network apparatus may be a router, a network switch, a firewall, a load balancer, a base station, a packet transport network (PTN) device, a serving GPRS support node (SGSN), a gateway GPRS support node (GGSN), a radio network controller (RNC), or a base station controller (BSC). The network apparatus includes a boundary clock. It may be understood that an operation related to a clock signal and performed by the network apparatus is actually performed by the boundary clock. For example, an operation of adding a timestamp to a sent or received packet by the network apparatus is performed by the boundary clock. For another example, that the network apparatus determines a time deviation and a frequency deviation of the network apparatus relative to a clock source according to a clock synchronization packet exchanged with the clock source is performed by the boundary clock. FIG. 4 is a schematic structural diagram of a specific implementation of the network apparatus. Referring to FIG. 4, the network apparatus may include a control board and a forwarding board. The control board may be coupled to the forwarding board by using a control channel. The control board includes a receiver, a parser, a central processing unit, a crystal oscillator, and an accumulator. The receiver may receive information from the forwarding board by using the control channel. The receiver is coupled to the parser. The parser is coupled to the central processing unit. The central processing unit includes a register. The crystal oscillator is coupled to the accumulator. The accumulator includes a storage unit. The central processing unit is coupled to the accumulator. The forwarding board includes a transceiver 1, a network processor, and a transceiver 2. The transceiver 1 is coupled to the network processor. The network processor is coupled to the transceiver 2. The transceiver 1 includes a physical layer device. The transceiver 2 includes a physical layer device. The BC may include a circuit configured to perform a timing function, and a circuit configured to add a timestamp. The circuit configured to perform the timing function includes the crystal oscillator and the accumulator. The circuit configured to add the timestamp may include the physical layer device of the transceiver 1 and the physical layer device of the transceiver 2.

For example, the router 13 shown in FIG. 2 may be specifically the network apparatus shown in FIG. 4. The port 1 of the router 13 may be specifically located on the transceiver 1. The port 3 of the router 13 may be specifically located on the transceiver 2. A first clock source may be the router 12. The router 13 may exchange a clock synchronization packet with the router 12 by using the port 1.

S301. The network apparatus exchanges a clock synchronization packet with the first clock source by using a first slave port.

The BC includes the first slave port and a first master port. The boundary clock is a device defined in the Precision Time Protocol (PTP). A slave port is a port defined in the PTP. A master port is a port defined in the PTP. The PTP may be the IEEE1588-2008 formulated by the IEEE. For example, the network apparatus may be the router 13 in FIG. 2. The first master port may be located on the port 1. The first slave port may be located on the port 3.

When the network apparatus exchanges clock synchronization with the first clock source, the first clock source is a master clock, and the network apparatus is a slave clock. The exchanging, by the network apparatus, a clock synchronization packet with a first clock source includes: sending, by the network apparatus, a clock synchronization packet to the first clock source, and receiving, by the network apparatus, a clock synchronization packet sent by the first clock source.

For example, S301 may specifically include: exchanging, by the network apparatus, the clock synchronization packet with the first clock source according to the IEEE1588-2008. For example, the first clock source sends a Sync message 1 to the network apparatus. The Sync message 1 may carry a timestamp 1. The timestamp 1 is used to indicate a time at which the first clock source sends the Sync message 1.

Referring to FIG. 4, after receiving the Sync message 1, the transceiver 1 may forward the Sync message 1 to the parser by using the control channel and the receiver. The parser parses the Sync message 1 to obtain the timestamp 1. When receiving the Sync message 1, the transceiver 1 may generate a timestamp 2 according to a time of receiving the Sync message 1. Specifically, when the transceiver 1 receives the Sync message 1, the physical layer device of the transceiver 1 may determine, by accessing the accumulator, the time of receiving the Sync message 1, and add the timestamp 2 to the Sync message 1. The timestamp 2 is used to indicate the time at which the network apparatus receives the Sync message 1. Responding to the Sync message 1, the network apparatus sends a Delay_Req message 1 to the first clock source by using the transceiver 1. The Delay_Req message 1 carries a timestamp 3. Specifically, when the transceiver 1 sends the Delay_Req message 1, the physical layer device of the transceiver 1 may determine, by accessing the accumulator, a time of sending the Delay_Req message 1, and add the timestamp 3 to the Delay_Req message 1. The timestamp 3 is used to indicate the time at which the boundary clock sends the Delay_Req message 1. Responding to the Delay_Req message 1, the first clock source sends a Delay_Resp message 1 to the network apparatus. The Delay_Resp message 1 carries a timestamp 4. The timestamp 4 is used to indicate a time at which the first clock source receives the Delay_Req message 1. After receiving the Delay_Resp message 1, the transceiver 1 may forward the Delay_Resp message 1 to the parser by using the control channel and the receiver. The parser parses the Delay_Resp message 1 to obtain the timestamp 4.

S302. The network apparatus determines a first time deviation of the boundary clock relative to the first clock source according to the clock synchronization packet exchanged with the first clock source.

The boundary clock avoids performing an operation of calibrating a time of a local clock of the boundary clock according to the first time deviation.

S302 may specifically include: determining, by the boundary clock, the first time deviation according to the IEEE1588-2008.

For example, in a specific implementation of S302, the first time deviation may be determined according to the timestamp 1, the timestamp 2, the timestamp 3, and the timestamp 4.

Referring to FIG. 4, the central processing unit may determine the first time deviation according to the timestamp 1, the timestamp 2, the timestamp 3, and the timestamp 4. For example, the first time deviation is equal to (timestamp 2−timestamp 1−timestamp 4+timestamp 3)/2. After determining the first time deviation, the central processing unit may store the first time deviation in the register of the central processing unit.

It should be pointed out that, according to the IEEE1588-2008, after the boundary clock determines the first time deviation, the boundary clock calibrates the time of the local clock of the boundary clock according to the first time deviation. Different from the IEEE1588-2008, in this embodiment, the boundary clock avoids performing an operation of calibrating the time of the local clock of the boundary clock according to the first time deviation. Therefore, the time of the boundary clock is not affected by the first clock source.

S303. The network apparatus sends a clock synchronization packet to a first slave clock of the boundary clock by using a first master port.

The clock synchronization packet sent by the network apparatus to the first slave clock includes a first timestamp generated by the boundary clock. A value of the first timestamp is equal to a first corrected value. The first corrected value is a value obtained by the boundary clock by correcting a time t1 of the local clock by using the first time deviation, where the time t1 is a time at which the boundary clock generates the first timestamp.

The boundary clock sends the clock synchronization packet to the first slave clock of the boundary, so that the first slave clock calibrates a time of the first slave clock according to the time synchronization packet exchanged with the BC.

Specifically, as a master clock, the boundary clock may perform a clock synchronization operation on a slave clock of the boundary clock by using the first master port of the boundary clock.

For example, the boundary clock may perform a clock synchronization operation on the first slave clock according to the IEEE1588-2008.

With reference to FIG. 4, the following describes the foregoing clock synchronization operation by using an example. For example, the base station 16 shown in FIG. 2 may be specifically the first slave clock. The port 3 may be located on the transceiver 2. The network apparatus shown in FIG. 4 may exchange a time synchronization packet with the base station 16 by using the transceiver 2, to perform a time synchronization operation. The time synchronization operation may include: sending, by the network apparatus, a Sync message 2 to the first slave clock by using the transceiver 2. The Sync message 2 may carry a timestamp 1'. The timestamp 1' is used to indicate a time at which the boundary clock sends the Sync message 2. For example, the first slave clock may include a receiver' and a parser'. After receiving the Sync message 2, the receiver' may forward the Sync message 2 to the parser'. The parser' parses the Sync message 2 to obtain the timestamp 1'. When receiving the Sync message 2, the first slave clock may generate a timestamp 2' according to a time of receiving the Sync message 2. The timestamp 2' is used to indicate the time at which the first slave clock receives the Sync message 2. Responding to the Sync message 2, the first slave clock sends a Delay_Req message 2 to the boundary clock. The Delay_Req message 2 carries a timestamp 3'. The timestamp 3' is used to indicate a time at which the first slave clock sends the Delay_Req message 2. Responding to the Delay_Req message 2, the boundary clock sends a Delay_Resp message 2 to the first slave clock by using the transceiver 2. The Delay_Resp message 2 carries a timestamp 4'. The timestamp 4' is used to indicate a time at which the boundary clock receives the Delay_Req message 2. After receiving the Delay_Resp message 2, the receiver' may forward the Delay_Resp message 2 to the parser'. The parser' parses the Delay_Resp message 2 to obtain the timestamp 4'. The first slave clock may determine a time deviation of the first slave clock relative to the boundary clock according to the timestamp 1', the timestamp 2', the timestamp 3', and the timestamp 4'. For example, a central processing unit of the first slave clock may determine the time deviation of the first slave clock relative to the boundary clock. For example, the time deviation of the first slave clock relative to the boundary clock is equal to (timestamp 2'−timestamp 1'−timestamp 4'+timestamp 3')/2. After determining the first time deviation, the central processing unit of the first slave clock may calibrate the time of the first slave clock according to the foregoing time deviation.

With reference to FIG. 4, the following describes, by using an example, a process in which the network apparatus generates the Sync message 2 carrying the timestamp 1'. When the network apparatus sends the Sync message 2 by using the transceiver 2, the first master port may add the timestamp 1' to the Sync message 2. Specifically, the transceiver 2 may include the first master port. The first master port may be an Ethernet port. The transceiver 2 includes the physical layer device. The physical layer device of the transceiver 2 may specifically perform an operation of adding the timestamp 1' to the Sync message 2.

Referring to FIG. 4, an output end of the control board is coupled to an input end of the accumulator. The storage unit of the accumulator stores a current time recorded by the boundary clock. The crystal oscillator may send a square wave to the accumulator. The square wave may include multiple pulse signals. The accumulator may perform an addition operation each time the accumulator receives a pulse signal. For example, a nominal working frequency of the crystal oscillator is 125 MHz. Theoretically, the accumulator may receive a pulse signal every 8 nanoseconds. When the accumulator detects a rising edge or a falling edge of a pulse signal, the accumulator performs an addition operation on a value of the time stored in the storage unit and 8 nanoseconds, and updates, by using an addition result, the time recorded in the storage unit. By means of the foregoing operation, the timing function of the network apparatus is implemented.

The physical layer device of the transceiver 2 may access the register of the central processing unit and the storage unit of the accumulator by using the control channel. Specifically, the physical layer device of the transceiver 2 may obtain the first time deviation by accessing the register of the central processing unit. The physical layer device of the transceiver 2 may obtain the time of the network apparatus by accessing the storage unit of the accumulator. The physical layer device of the transceiver 2 may correct the time of the network apparatus by using the first time deviation, to obtain the timestamp 1'. For example, the physical layer device of the transceiver 2 may perform an addition operation on the first time deviation and the time of the boundary clock, to obtain the timestamp 1'.

The first corrected value is a value obtained by the boundary clock by correcting the time t1 of the local clock by using the first time deviation, where the time t1 is a time at which the boundary clock generates the first timestamp. That is, the network apparatus needs to first perform S302 and then perform S303. In addition, the network apparatus needs to perform S303 according to a result (the first time deviation) obtained by performing S302. Before the network apparatus performs S303, the network apparatus may perform multiple interactions with the first clock source (for example, the router 12). Each interaction includes: sending, by the first clock source, a Sync message to the network apparatus. Responding to the Sync message, the network apparatus sends a Delay_Req message to the first clock source. Responding to the Delay_Req message, the first clock source sends a Delay_Resp message to the network apparatus. That is, a time synchronization packet related to each interaction includes a Sync message, a Delay_Req message, and a Delay_Resp message. The network apparatus may obtain one time deviation according to three time synchronization packets related to each interaction. The network apparatus may obtain multiple time deviations according to the multiple interactions. Each interaction is corresponding to a time deviation. Any two time deviations of the multiple time deviations may be equal, or may be not equal. The network apparatus may save the multiple time deviations. When the network apparatus performs S303, the network apparatus may determine the first timestamp by using any one of the multiple time deviations. Optionally, the network apparatus may save only a latest time deviation that is determined. That is, the network apparatus may first save a time deviation that is determined during a previous interaction. When a new time deviation is determined by means of a current interaction, the time deviation that is determined during the previous interaction is updated to the new time deviation. When the network apparatus performs S303, the network apparatus may determine the first timestamp by using the latest time deviation. Generally, the latest time deviation can more accurately reflect a current time deviation of the network apparatus relative to the first clock source.

Similarly, when the physical layer device of the transceiver 2 receives the Delay_Req message 2 from the first slave clock (for example, a base station 16), the physical layer device of the transceiver 2 may obtain, by accessing the register of the central processing unit, a time deviation determined by the central processing unit when the physical layer device of the transceiver 2 receives the Delay_Req message 2. In addition, when the physical layer device of the transceiver 2 receives the Delay_Req message 2 from the first slave clock, the physical layer device of the transceiver 2 may obtain, by accessing the storage unit of the accumulator, a time that is of the boundary clock and at which the physical layer device of the transceiver 2 receives the Delay_Req message 2. The physical layer device of the transceiver 2 may perform an addition operation on the time deviation and the time of the boundary block that are obtained by the physical layer device of the transceiver 2 when the physical layer device of the transceiver 2 receives the Delay_Req message 2, to obtain the timestamp 4'.

It can be learned, from the foregoing description, that a value of the timestamp 1' is not equal to a time that is of the boundary clock and that is recorded by the accumulator of the boundary clock when the network apparatus sends the Sync message 2 by using the transceiver 2. Although the network apparatus exchanges the time synchronization packet with the first clock source and determines the time deviation of the network apparatus relative to the first clock source, the network apparatus does not calibrate the time of the network apparatus according to the first time deviation. Therefore, when the network apparatus sends the Sync message 2 by using the transceiver 2, the time that is of the network apparatus and that is recorded by the accumulator of the network apparatus may be inaccurate. That is, when the network apparatus sends the Sync message 2 by using the transceiver 2, a relatively large difference may exist between the time that is of the network apparatus and that is recorded by the accumulator of the network apparatus and a real value of the time at which the network apparatus sends the Sync message 2. In the foregoing technical solution, the value of the timestamp 1' is a value obtained by correcting, by using the first time deviation, the time that is of the network apparatus and that is recorded by the accumulator of the network apparatus. Therefore, the value of the timestamp 1' may be relatively accurate. That is, a possible difference between the value of the timestamp 1' and the real value of the time at which the network apparatus sends the Sync message 2 may be relatively small. In addition, although the network apparatus does not calibrate the time of the network apparatus according to the time synchronization packet exchanged with the first clock source, a value of a timestamp (for example, the timestamp 1') generated by the network apparatus is equal to a value of a timestamp that is generated by the network apparatus according to the time of the boundary clock (for example, a current time recorded by the memory of the accumulator) when the network apparatus calibrates the time of the network apparatus according to the time synchronization packet exchanged with the first clock source. Therefore, in the foregoing solution, the network apparatus implements a technical effect of transferring a clock signal of the first clock source to a signal of the first slave clock when the boundary clock does not calibrate the time of the network apparatus according to the first clock source.

Similarly, a value of the timestamp 4' is not equal to the time that is of the network apparatus and that is recorded by the accumulator of the network apparatus when the network apparatus receives the Delay_Req message 2 by using the transceiver 2. A value of a timestamp (for example, the timestamp 4') generated by the network apparatus is equal to a value of a timestamp that is generated by the network apparatus according to the time of the network apparatus (for example, the current time recorded by the memory of the accumulator) when the network apparatus calibrates the time of the network apparatus according to the time synchronization packet exchanged with the first clock source. Therefore, in the foregoing solution, the network apparatus implements a technical effect of transferring a clock signal of the first clock source to a signal of the first slave clock when the network apparatus does not calibrate the time of the network apparatus according to the first clock source.

Optionally, in the method shown in FIG. 3, after S301 and before S303, the method further includes: determining, by the boundary clock, a first frequency deviation of the boundary clock relative to the first clock source according to the clock synchronization packet exchanged with the first clock source.

The network apparatus avoids calibrating a frequency of the local clock of the boundary clock according to the first frequency deviation. The first corrected value is a value obtained by correcting t1 by using the first time deviation and the first frequency deviation.

For example, the clock synchronization packet exchanged between the network apparatus and the first clock source includes the Sync message 1 and a follow-up message that are sent by the first clock source to the network apparatus according to the IEEE1588-2008. The Sync message 1 includes the timestamp 1 generated by the first clock source. The network apparatus generates the timestamp 2 when receiving the Sync message 1. The timestamp 1 is used to indicate the time of sending the Sync message 1. The timestamp 2 is used to indicate the time of receiving the Sync message 1. The follow-up message includes a timestamp 7 generated by the first clock source. The network apparatus generates a timestamp 8 when receiving the follow-up message. The timestamp 7 is used to indicate a time of sending the follow-up message. The timestamp 8 is used to indicate a time of receiving the follow-up message.

The central processing unit of the network apparatus may determine the first frequency deviation according to the timestamp 1, the timestamp 2, a timestamp 7, and a timestamp 8. For example, the first frequency deviation is equal to (timestamp 8−timestamp 7−timestamp 2+timestamp 1)/(timestamp 7−timestamp 1). After determining the first frequency deviation, the central processing unit may store the first frequency deviation in the register of the central processing unit.

It should be pointed out that, according to the IEEE1588-2008, after the network apparatus determines the first frequency deviation, the network apparatus calibrates the frequency of the local clock of the boundary clock according to the first frequency deviation. Different from the IEEE1588-2008, in this embodiment, the boundary clock avoids performing an operation of calibrating the frequency of the local clock of the boundary clock according to the first frequency deviation. Therefore, the frequency of the boundary clock is not affected by the first clock source.

The foregoing technical solution shows that a frequency deviation of the network apparatus relative to the first clock source is the first frequency deviation. As time elapses, the first frequency deviation makes the network apparatus generate a phase deviation relative to the first clock source.

For example, the frequency of the network apparatus is higher than a frequency of the first clock source. For example, the frequency of the network apparatus is higher than the frequency of the first clock source by 1 (Part Per Million, ppm). It is assumed that duration from a time at which the network apparatus determines the first frequency deviation to the time at which the network apparatus generates the first timestamp is 8 milliseconds. Within the duration of 8 milliseconds, due to the frequency deviation of the network apparatus relative to the first clock source, the network apparatus generates a phase deviation of 8 nanoseconds relative to the first clock source.

The central processing unit of the network apparatus may store the first frequency deviation in the register of the central processing unit. In addition, the network apparatus may further use the accumulator to record the phase deviation that is of the network apparatus relative to the first clock source and that is caused by the frequency deviation of the network apparatus relative to the first clock source, and continuously update the phase deviation of the network apparatus relative to the first clock source.

Within the duration from the time at which the network apparatus determines the first frequency deviation to the time at which the network apparatus generates the first timestamp, the network apparatus may not determine another frequency deviation of the network apparatus relative to the first clock source.

Alternatively, within the duration from the time at which the network apparatus determines the first frequency deviation to the time at which the network apparatus generates the first timestamp, the network apparatus may perform one or multiple interactions with the first clock source to exchange a clock synchronization packet. A clock synchronization packet in each interaction may include a Sync message and a follow-up message. The network apparatus may determine a new frequency deviation of the network apparatus relative to the first clock source according to the clock synchronization packet in each interaction.

For example, the time at which the network apparatus determines the first frequency deviation is a time 1. The time at which the network apparatus generates the first timestamp is a time 2. The duration from the time at which the network apparatus determines the first frequency deviation to the time at which the network apparatus generates the first timestamp is a difference between the time 2 and the time 1. The network apparatus exchanges one clock synchronization packet between the time 1 and the time 2, and determines a new frequency deviation (a frequency deviation 1) of the network apparatus relative to the first clock source at a time 3. In this case, the phase deviation that is of the local clock relative to the first clock source and that is caused by the first frequency deviation within the duration from the time at which the local clock determines the first frequency deviation to the time at which the BC generates the first timestamp includes a first part and a second part.

The first part is equal to a phase deviation that is of the network apparatus relative to the first clock source and that is caused by the first frequency deviation within duration from the time 1 to the time 3. The second part is equal to a phase deviation that is of the network apparatus relative to the first clock source and that is caused by the frequency deviation 1 within duration from the time 3 to the time 2. A value of the first part is equal to (time 3−time 1)×(first frequency deviation). A value of the second part is equal to (time 2−time 3)×(frequency deviation 1).

Optionally, in the foregoing technical solution, the first corrected value is equal to a sum of t1, the first time deviation, and a first phase deviation, and the first phase deviation is the phase deviation that is of the local clock relative to the first clock source and that is caused by the first frequency deviation within the duration from the time at which the local clock determines the first frequency deviation to the time at which the BC generates the first timestamp.

For example, the physical layer device of the transceiver 2 may obtain the first time deviation, the first frequency deviation, and the phase deviation from the register of the central processing unit. For example, it is assumed that t1 is equal to 1 minute and 5 seconds past 8 o'clock, the first time deviation is equal to 1 millisecond, and the first phase deviation is equal to 8 nanoseconds. The first corrected value is equal to 1 minute, 5 seconds, 1 millisecond, and 8 nanoseconds past 8 o'clock.

Optionally, in the foregoing technical solution, the method may further include:

exchanging, by the network apparatus, a clock synchronization packet with a second clock source by using a second slave port, where the BC includes the second slave port and a second master port;

determining, by the network apparatus, a second time deviation of the BC relative to the second clock source according to the clock synchronization packet exchanged with the second clock source, where the BC avoids performing an operation of calibrating the time of the local clock of the BC according to the second time deviation; and sending, by the network apparatus, a clock synchronization packet to a second slave clock by using the second master port, where the clock synchronization packet sent by the network apparatus to the second slave clock includes a second timestamp generated by the BC, a value of the second timestamp is equal to a second corrected value, and the second corrected value is a value obtained by the boundary clock by correcting a time t2 of the local clock by using the second time deviation, where the time t2 is a time at which the BC generates the second timestamp.

The network apparatus sends the clock synchronization packet to the second slave clock, so that the second slave clock calibrates a time of the second slave clock according to the time synchronization packet exchanged with the network apparatus.

The second clock source and the first clock source are different clock sources. For example, time precision of the first clock source is not equal to time precision of the second clock source, or frequency precision of the first clock source is not equal to frequency precision of the second clock source. Alternatively, time precision of the first clock source is not equal to time precision of the second clock source, and frequency precision of the first clock source is not equal to frequency precision of the second clock source.

For example, the router 15 in FIG. 2 may be the second clock source. The router 13 may exchange a clock synchronization packet with the router 15 by using the port 2. The second master port may be located on the port 2. For a process in which the router 13 may exchange the clock synchronization packet with the router 15 by using the port 2, refer to the foregoing description about that the boundary clock exchanges the clock synchronization packet with the first clock source. Details are not described herein again.

For a process in which the network apparatus determines the second time deviation of the network apparatus relative to the second clock source according to the clock synchronization packet exchanged with the second clock source, refer to the foregoing description about that the network apparatus determines the first time deviation of the network apparatus relative to the first clock source according to the clock synchronization packet exchanged with the first clock source. Details are not described herein again. It may be understood that the first time deviation may be equal to the second time deviation, or the first time deviation may be not equal to the second time deviation. In addition, the second time deviation may be stored in the register of the central processing unit of the network apparatus.

For example, the base station 17 in FIG. 2 may be the second slave clock. The second slave port may be located on a port 4. The network apparatus (for example, the router 13) may send a clock synchronization packet to the second slave clock (for example, the base station 17) by using the second master port (for example, the port 4). Therefore, the router 13 may calibrate a local clock of the base station 17.

Optionally, in the foregoing technical solution, the second corrected value is equal to a sum of t2, the second time deviation, and a second phase deviation, and the second phase deviation is a phase deviation that is of the local clock relative to the second clock source and that is caused by a second frequency deviation within duration from a time at which the local clock determines the second frequency deviation to the time at which the BC generates the second timestamp.

For a process of obtaining the second corrected value, refer to the foregoing description about a process of obtaining the first corrected value. Details are not described herein again.

In the foregoing technical solution, the first slave clock and the second slave clock are different network apparatuses. The network apparatus may calibrate the time of the first slave clock and the time of the second slave clock. In addition, although the network apparatus does not calibrate the local clock of the network apparatus according to the first clock source, a timestamp used by the network apparatus to calibrate the first slave clock is related to the first clock source. The network apparatus and the first clock source are located in a same clock domain. Similarly, although the network apparatus does not calibrate the local clock of the network apparatus according to the second clock source, a timestamp used by the network apparatus to calibrate the second slave clock is related to the second clock source. The network apparatus and the second clock source are located in a same clock domain. That is, the network apparatus may be located in two clock domains at the same time, and may respectively transfer signals from different clock domains to the first slave clock and the second slave clock.

Optionally, the time precision of the first clock source is different from the time precision of the second clock source. The frequency precision of the first clock source is different from the frequency precision of the second clock source.

Optionally, in the foregoing technical solution, the first slave port and the second slave port are located on a same physical port of the network apparatus, or the first slave port and the second slave port are located on different physical ports of the network apparatus.

Optionally, in the foregoing technical solution, the first master port and the second master port are located on a same physical port of the network apparatus, or the first master port and the second master port are located on different physical ports of the network apparatus.

Optionally, in the foregoing technical solution, before the exchanging, by the network apparatus, a clock synchronization packet with a first clock source by using a first slave port, the method further includes:

calibrating, by the network apparatus, the frequency of the boundary clock according to a BITS clock.

For example, the BITS clock may be a component of the network apparatus. Alternatively, the BITS clock may be a device independent of the network apparatus.

Figure 5:
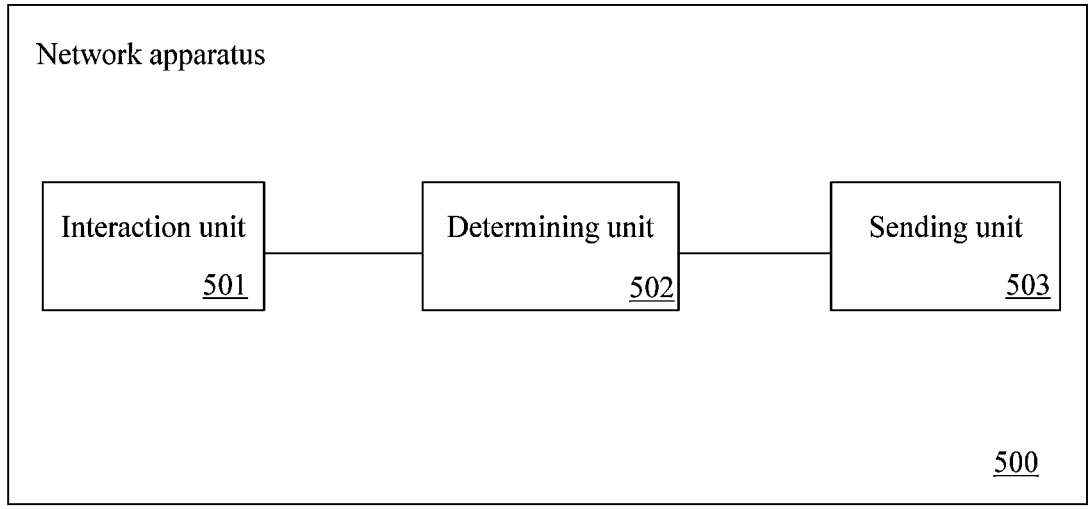
FIG. 5 is a schematic structural diagram of a network apparatus according to an embodiment.

FIG. 5 is a schematic structural diagram of a network apparatus 500 according to an embodiment of the present invention. Referring to FIG. 5, the network apparatus includes: an interaction unit 501, a determining unit 502, and a sending unit 503. For example, the network apparatus 500 may be specifically the network apparatus shown in FIG. 4. For a specific implementation of the network apparatus 500, refer to the description in the embodiment corresponding to FIG. 4. The network apparatus 500 specifically performs the method shown in FIG. 3. For a specific implementation of the network apparatus 500, refer to the description in the embodiment corresponding to FIG. 3.

The interaction unit 501 is configured to exchange a clock synchronization packet with a first clock source by using a first slave port, where the network apparatus includes a boundary clock BC, and the BC includes the first slave port and a first master port.

For example, the interaction unit 501 may be configured to perform S301.

For example, the interaction unit 501 may specifically include the transceiver 1 in FIG. 4. For example, the network apparatus 500 may be the router 13 in FIG. 2. The first slave port may be located on a port 1. The first clock source may be the router 12. The router 13 may exchange a clock synchronization packet with the router 12 by using a port 2.

The determining unit 502 is configured to determine a first time deviation of the BC relative to the first clock source according to the clock synchronization packet exchanged with the first clock source, where the BC avoids performing an operation of calibrating a time of a local clock of the BC according to the first time deviation.

For example, the determining unit 502 may be configured to perform S302.

For example, the determining unit 502 may include the central processing unit, the crystal oscillator, and the accumulator in FIG. 4.

The sending unit 503 is configured to send a clock synchronization packet to a first slave clock of the BC by using the first master port, where the clock synchronization packet sent by the network apparatus to the first slave clock includes a first timestamp generated by the BC, a value of the first timestamp is equal to a first corrected value, and the first corrected value is a value obtained by the BC by correcting a time t1 of the local clock by using the first time deviation, where the time t1 is a time at which the BC generates the first timestamp.

For example, the sending unit 503 may be configured to perform S303.

For example, the sending unit 503 may be the transceiver 2 in FIG. 4. For example, the first master port may be located on a port 3. The first slave clock may be a base station 16. The router 13 may send a clock synchronization packet to the base station 16 by using the port 3.

Optionally, in the foregoing technical solution, the determining unit 502 is further configured to: after the interaction unit 501 exchanges the clock synchronization packet with the first clock source by using the first slave port, and before the sending unit 503 sends the clock synchronization packet to the first slave clock of the BC by using the first master port, determine a first frequency deviation of the BC relative to the first clock source according to the clock synchronization packet exchanged with the first clock source, where the BC avoids performing an operation of calibrating a frequency of the local clock of the BC according to the first frequency deviation, and the first corrected value is a value obtained by the BC by correcting t1 by using the first time deviation and the first frequency deviation.

Optionally, in the foregoing technical solution, the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the BC generates the first timestamp.

Optionally, in the foregoing technical solution, the interaction unit 501 is further configured to exchange a clock synchronization packet with a second clock source by using a second slave port, where the BC includes the second slave port and a second master port.

The determining unit 502 is further configured to determine a second time deviation of the BC relative to the second clock source according to the clock synchronization packet exchanged with the second clock source, where the BC avoids performing an operation of calibrating the time of the local clock of the BC according to the second time deviation.

The sending unit 503 is further configured to send a clock synchronization packet to a second slave clock of the BC by using the second master port, where the clock synchronization packet sent by the network apparatus to the second slave clock includes a second timestamp generated by the BC, a value of the second timestamp is equal to a second corrected value, and the second corrected value is a value obtained by correcting a time t2 of the local clock by using the second time deviation, where the time t2 is a time at which the BC generates the second timestamp.

For example, the second clock source may be a router 15. The second master port may be located on a port 4. The second slave port may be located on the port 2. The second slave clock may be a base station 17. The router 13 may send a clock synchronization packet to the base station 17 by using the port 4.

Optionally, in the foregoing technical solution, the determining unit 502 is further configured to: after the interaction unit 501 exchanges the clock synchronization packet with the second clock source by using the second slave port, and before the sending unit 503 sends the clock synchronization packet to the second slave clock of the BC by using the second master port, determine a second frequency deviation of the BC relative to the second clock source according to the clock synchronization packet exchanged with the second clock source, where the BC avoids performing an operation of calibrating the frequency of the local clock of the BC according to the second frequency deviation, and the second corrected value is a value obtained by the BC by correcting t2 by using the second time deviation and the second frequency deviation.

Optionally, in the foregoing technical solution, the second corrected value is equal to a sum of t2, the second time deviation, and a second phase deviation, and the second phase deviation is a phase deviation that is of the local clock relative to the second clock source and that is caused by the second frequency deviation within duration from a time at which the local clock determines the second frequency deviation to the time at which the BC generates the second timestamp.

Optionally, in the foregoing technical solution, the first slave port and the second slave port are located on a same physical port of the network apparatus, or the first slave port and the second slave port are located on different physical ports of the network apparatus.

Optionally, in the foregoing technical solution, the first master port and the second master port are located on a same physical port of the network apparatus, or the first master port and the second master port are located on different physical ports of the network apparatus.

Optionally, in the foregoing technical solution, the network apparatus further includes a calibration unit. The calibration unit is configured to: before the interaction unit 501 exchanges the clock synchronization packet with the first clock source by using the first slave port, calibrate the frequency of the BC according to a building integrated timing supply (building integrated timing supply, BITS) clock.

For example, the BITS clock may be a component of the network apparatus.

Alternatively, the BITS clock may be a device independent of the network apparatus.

Figure 6:
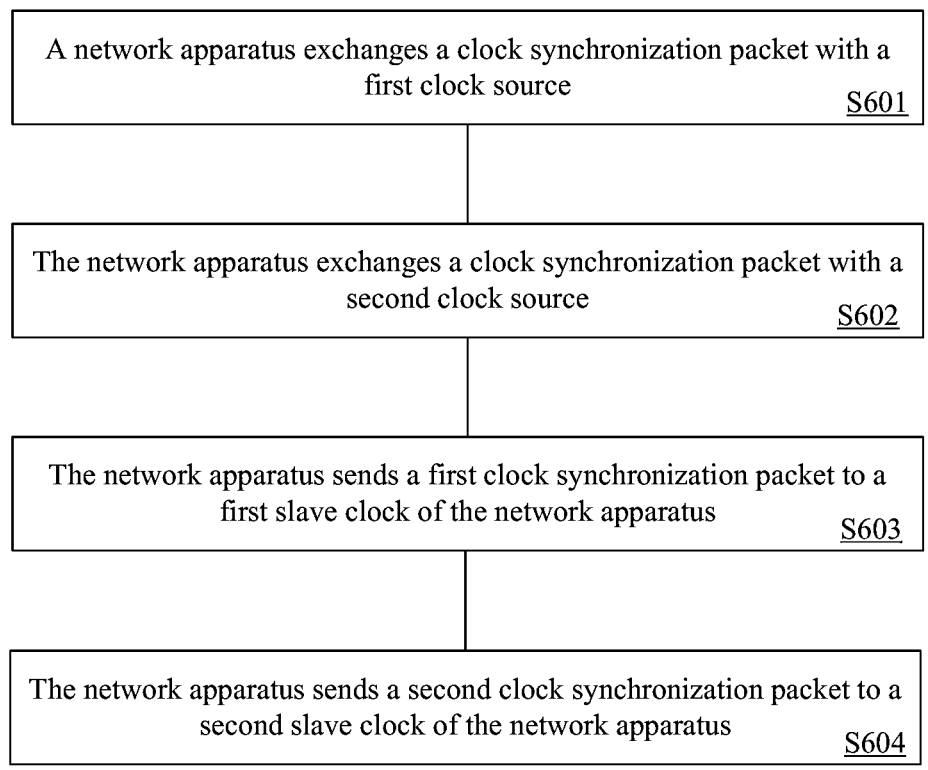
FIG. 6 is a schematic flowchart of a method for exchanging a clock synchronization packet according to an embodiment.

FIG. 6 is a schematic flowchart of a method for exchanging a clock synchronization packet according to an embodiment of the present invention. The method includes S601, S602, S603, and S604.

The solution shown in FIG. 6 is executed by a network apparatus. For example, the network apparatus may be the router 13 shown in FIG. 2.

S601. The network apparatus exchanges a clock synchronization packet with a first clock source.

For example, the first clock source may be the router 12. The router 13 may exchange a clock synchronization packet with the router 12 by using a port 1.

For example, S601 may be specifically S301 in FIG. 3. For a specific implementation of S601, refer to the description in the embodiment corresponding to FIG. 3.

S602. The network apparatus exchanges a clock synchronization packet with a second clock source.

For example, the secondfirst clock source may be a router 15. The router 13 may exchange a clock synchronization packet with the router 15 by using a port 2.

S603. The network apparatus sends a first clock synchronization packet to a first slave clock of the network apparatus.

Further, the first slave clock may calibrate a time of the first slave clock according to a clock synchronization packet (including the first clock synchronization packet) exchanged with the network apparatus.

For example, the first slave clock may be a base station 16. The router 13 may send the first clock synchronization packet to the base station 16 by using a port 3.

Specifically, S603 is performed after S601 and S602.

The first clock synchronization packet carries a first timestamp generated by the network apparatus. A time indicated by the first timestamp is equal to a time that is of the first clock source and at which the network apparatus sends the first clock synchronization packet.

It may be understood that, before the network apparatus sends the first clock synchronization packet, if the network apparatus has calibrated a time of the network apparatus according to the clock synchronization packet exchanged with the first clock source, the time indicated by the first timestamp is equal to a time that is of the network apparatus and at which the network apparatus sends the first clock synchronization packet.

S604. The network apparatus sends a second clock synchronization packet to a second slave clock of the network apparatus.

Further, the second slave clock may calibrate a time of the second slave clock according to a clock synchronization packet (including the second clock synchronization packet) exchanged with the network apparatus.

For example, the second slave clock may be a base station 17. The router 13 may send the second clock synchronization packet to the base station 17 by using a port 4.

Specifically, S604 is performed after S601 and S602.

The first clock synchronization packet carries a second timestamp generated by the network apparatus. A time indicated by the second timestamp is equal to a time that is of the second clock source and at which the network apparatus sends the second clock synchronization packet.

It may be understood that, before the network apparatus sends the second clock synchronization packet, if the network apparatus has calibrated the time of the network apparatus according to the clock synchronization packet exchanged with the second clock source, the time indicated by the second timestamp is equal to a time that is of the network apparatus and at which the network apparatus sends the second clock synchronization packet.

In the foregoing technical solution, the first slave clock and the second slave clock are different network apparatuses. The network apparatus may calibrate the time of the first slave clock and the time of the second slave clock. In addition, the network apparatus and the first clock source are located in a same clock domain. The network apparatus and the second clock source are located in a same clock domain. That is, the network apparatus may be located in two clock domains at the same time, and may respectively transfer signals from different clock domains to the first slave clock and the second slave clock.

Optionally, a value of the first timestamp is determined in the following manner:

after the network apparatus exchanges the clock synchronization packet with the first clock source, determining, by the network apparatus, a first time deviation of the network apparatus relative to the first clock source according to the clock synchronization packet exchanged with the first clock source, where the network apparatus avoids performing an operation of calibrating a time of a local clock of the network apparatus according to the first time deviation; and determining, by the network apparatus, that the value of the first timestamp is equal to a first corrected value, where the first corrected value is a value obtained by the network apparatus by correcting a time t1 of the local clock by using the first time deviation, where the time t1 is a time at which the network apparatus generates the first timestamp.

For example, for a specific implementation of determining, by the network apparatus, the first time deviation of the network apparatus relative to the first clock source, refer to the description about the process of determining the first time deviation in the embodiment corresponding to FIG. 3.

For example, for a specific process of determining the first corrected value by the network apparatus, refer to the description about the process of determining the first corrected value in the embodiment corresponding to FIG. 3.

Optionally, the value of the first timestamp is specifically determined in the following manner:

after the network apparatus exchanges the clock synchronization packet with the first clock source, determining, by the network apparatus, a first frequency deviation of the network apparatus relative to the first clock source according to the clock synchronization packet exchanged with the first clock source, where the network apparatus avoids performing an operation of calibrating a frequency of the local clock according to the first frequency deviation; and determining, by the network apparatus, that the value of the first timestamp is equal to the first corrected value, where the first corrected value is a value obtained by the network apparatus by correcting t1 by using the first time deviation and the first frequency deviation.

For example, for a specific implementation of determining, by the network apparatus, the first frequency deviation of the network apparatus relative to the first clock source, refer to the description about the process of determining the first frequency deviation in the embodiment corresponding to FIG. 3.

For example, for a specific process of determining the first corrected value by the network apparatus, refer to the description about the process of determining the first corrected value in the embodiment corresponding to FIG. 3.

Optionally, the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the network apparatus generates the first timestamp.

For a specific implementation of how a frequency deviation causes a phase deviation, refer to the description in the embodiment corresponding to FIG. 3, especially the description about that 1 ppm causes a phase deviation of 8 nanoseconds in the embodiment corresponding to FIG. 3.

Optionally, a value of the second timestamp is determined in the following manner:

after S602, determining, by the network apparatus, a second time deviation of the network apparatus relative to the second clock source according to the clock synchronization packet exchanged with the second clock source, where the network apparatus avoids performing an operation of calibrating the time of the local clock of the network apparatus according to the second time deviation; and determining, by the network apparatus, that the value of the second timestamp is equal to a second corrected value, where the second corrected value is a value obtained by correcting a time t2 of the local clock by using the second time deviation, where the time t2 is a time at which the network apparatus generates the second timestamp.

Optionally, the value of the second timestamp is specifically determined in the following manner:

after S602, determining, by the network apparatus, a second frequency deviation of the network apparatus relative to the second clock source according to the clock synchronization packet exchanged with the second clock source, where the network apparatus avoids performing an operation of calibrating the frequency of the local clock of the network apparatus according to the second frequency deviation; and determining, by the network apparatus, that the value of the second timestamp is equal to the second corrected value, where the second corrected value is a value obtained by the network apparatus by correcting t2 by using the second time deviation and the second frequency deviation.

Optionally, in the foregoing technical solution, the second corrected value is equal to a sum of t2, the second time deviation, and a second phase deviation, and the second phase deviation is a phase deviation that is of the local clock relative to the second clock source and that is caused by the second frequency deviation within duration from a time at which the local clock determines the second frequency deviation to the time at which the network apparatus generates the second timestamp.

Figure 7:
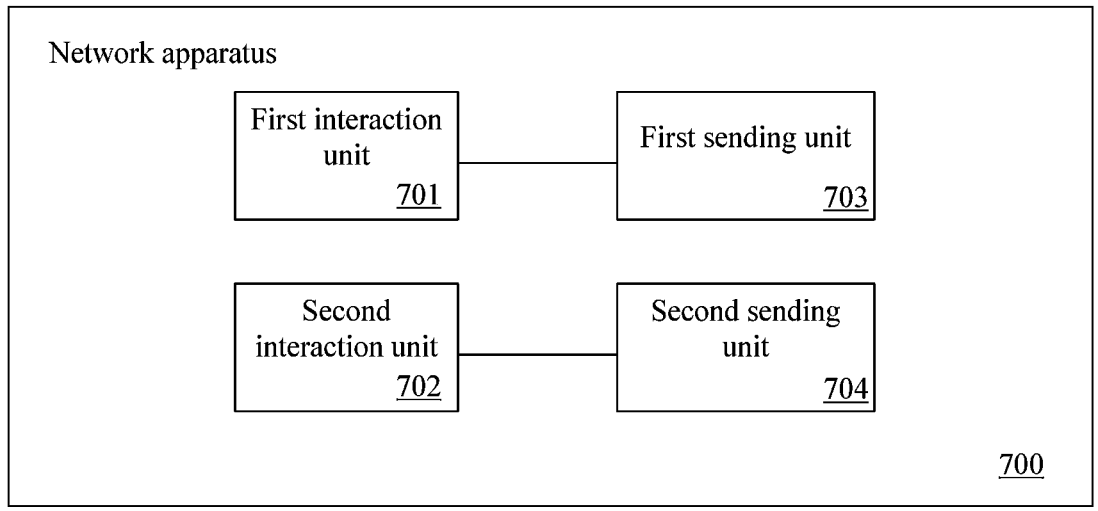
FIG. 7 is a schematic structural diagram of a network apparatus according to an embodiment.

FIG. 7 is a schematic structural diagram of a network apparatus according to an embodiment of the present invention. Referring to FIG. 7, the network apparatus 700 includes a first interaction unit 701, a second interaction unit 702, a first sending unit 703, and a second sending unit 704. The network apparatus 700 may be specifically the network apparatus in the method shown in FIG. 6. Specifically, the network apparatus 700 may perform the method shown in FIG. 6.

The first interaction unit 701 is configured to exchange a clock synchronization packet with a first clock source.

For example, the first interaction unit 701 may perform S601. For a specific implementation of the first interaction unit 701, refer to the description in the embodiment corresponding to FIG. 6, especially the description about S601 in the embodiment corresponding to FIG. 6.

The second interaction unit 702 is configured to exchange a clock synchronization packet with a second clock source.

For example, the second interaction unit 702 may perform S602. For a specific implementation of the second interaction unit 702, refer to the description in the embodiment corresponding to FIG. 6, especially the description about S602 in the embodiment corresponding to FIG. 6.

The first sending unit 703 is configured to: after the first interaction unit 701 exchanges the clock synchronization packet with the first clock source, and after the second interaction unit 702 exchanges the clock synchronization packet with the second clock source, send a first clock synchronization packet to a first slave clock of the network apparatus.

The first clock synchronization packet carries a first timestamp generated by the network apparatus. A time indicated by the first timestamp is equal to a time that is of the first clock source and at which the network apparatus sends the first clock synchronization packet.

For example, the first sending unit 703 may perform S603. For a specific implementation of the first sending unit 703, refer to the description in the embodiment corresponding to FIG. 6, especially the description about S603 in the embodiment corresponding to FIG. 6.

The second sending unit 704 is configured to: after the first interaction unit 701 exchanges the clock synchronization packet with the first clock source, and after the second interaction unit 702 exchanges the clock synchronization packet with the second clock source, send a second clock synchronization packet to a second slave clock of the network apparatus.

The first clock synchronization packet carries a second timestamp generated by the network apparatus. A time indicated by the second timestamp is equal to a time that is of the second clock source and at which the network apparatus sends the second clock synchronization packet.

For example, the second sending unit 704 may perform S604. For a specific implementation of the second sending unit 704, refer to the description in the embodiment corresponding to FIG. 6, especially the description about S604 in the embodiment corresponding to FIG. 6.

Optionally, in the foregoing technical solution, the network apparatus 700 further includes a determining unit.

The determining unit is configured to: after the first interaction unit 701 exchanges the clock synchronization packet with the first clock source, determine a first time deviation of the network apparatus relative to the first clock source according to the clock synchronization packet exchanged with the first clock source, where the network apparatus avoids performing an operation of calibrating a time of a local clock of the network apparatus according to the first time deviation.

The determining unit is further configured to determine that a value of the first timestamp is equal to a first corrected value, where the first corrected value is a value obtained by the network apparatus by correcting a time t1 of the local clock by using the first time deviation, where the time t1 is a time at which the network apparatus generates the first timestamp.

For example, for a specific implementation of determining, by the network apparatus, the first time deviation of the network apparatus relative to the first clock source, refer to the description about the process of determining the first time deviation in the embodiment corresponding to FIG. 3.

For example, for a specific process of determining the first corrected value by the network apparatus, refer to the description about the process of determining the first corrected value in the embodiment corresponding to FIG. 3.

Optionally, in the foregoing technical solution, the determining unit is further configured to: after the first interaction unit 701 exchanges the clock synchronization packet with the first clock source, determine a first frequency deviation of the network apparatus relative to the first clock source according to the clock synchronization packet exchanged with the first clock source, where the network apparatus avoids performing an operation of calibrating a frequency of the local clock according to the first frequency deviation, and the first corrected value is a value obtained by the network apparatus by correcting t1 by using the first time deviation and the first frequency deviation.

For example, for a specific implementation of determining, by the network apparatus, the first frequency deviation of the network apparatus relative to the first clock source, refer to the description about the process of determining the first frequency deviation in the embodiment corresponding to FIG. 3.

For example, for a specific process of determining the first corrected value by the network apparatus, refer to the description about the process of determining the first corrected value in the embodiment corresponding to FIG. 3.

Optionally, in the foregoing technical solution, the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the network apparatus generates the first timestamp.

For a specific implementation of how a frequency deviation causes a phase deviation, refer to the description in the embodiment corresponding to FIG. 3, especially a the description about that 1 ppm causes a phase deviation of 8 nanoseconds in the embodiment corresponding to FIG. 3.

Optionally, a value of the second timestamp is determined in the following manner:

after the second interaction unit 702 exchanges the clock synchronization packet with the second clock source, determining, by the network apparatus, a second time deviation of the network apparatus relative to the second clock source according to the clock synchronization packet exchanged with the second clock source, where the network apparatus avoids performing an operation of calibrating the time of the local clock of the network apparatus according to the second time deviation; and determining, by the network apparatus, that the value of the second timestamp is equal to a second corrected value, where the second corrected value is a value obtained by correcting a time t2 of the local clock by using the second time deviation, where the time t2 is a time at which the network apparatus generates the second timestamp.

Optionally, the value of the second timestamp is specifically determined in the following manner:

after the second interaction unit 702 exchanges the clock synchronization packet with the second clock source, determining, by the network apparatus, a second frequency deviation of the network apparatus relative to the second clock source according to the clock synchronization packet exchanged with the second clock source, where the network apparatus avoids performing an operation of calibrating the frequency of the local clock of the network apparatus according to the second frequency deviation; and determining, by the network apparatus, that the value of the second timestamp is equal to the second corrected value, where the second corrected value is a value obtained by the network apparatus by correcting t2 by using the second time deviation and the second frequency deviation.

Optionally, in the foregoing technical solution, the second corrected value is equal to a sum of t2, the second time deviation, and a second phase deviation, and the second phase deviation is a phase deviation that is of the local clock relative to the second clock source and that is caused by the second frequency deviation within duration from a time at which the local clock determines the second frequency deviation to the time at which the network apparatus generates the second timestamp.

Figure 8:
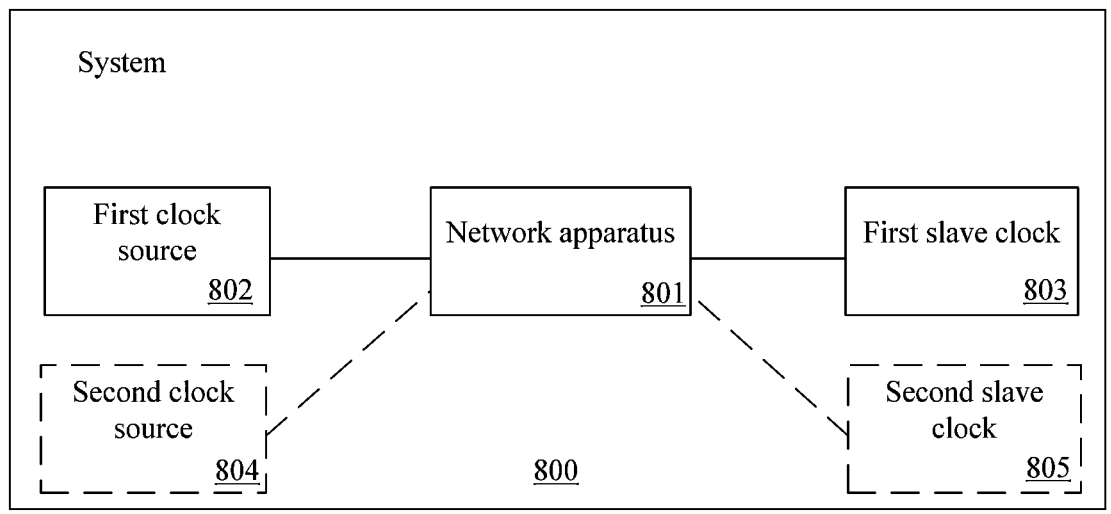
FIG. 8 is a schematic structural diagram of a system according to an embodiment.

FIG. 8 is a schematic structural diagram of a system according to an embodiment of the present invention. The system 800 includes a network apparatus 801, a first clock source 802, and a first slave clock 803. Specifically, the network apparatus 801 may be the network apparatus 500 shown in FIG. 5. The first clock source 802 may be the first clock source mentioned in the embodiment corresponding to FIG. 5. The first slave clock 803 may be the first slave clock mentioned in the embodiment corresponding to FIG. 5.

For specific implementations of the network apparatus 801, the first clock source 802, and the first slave clock 803, refer to the description in the embodiment corresponding to FIG. 5.

Optionally, the system 800 may further include a second clock source 804 and a second slave clock 805. Specifically, the second clock source 804 may be the second clock source mentioned in the embodiment corresponding to FIG. 5. The second slave clock 805 may be the second slave clock mentioned in the embodiment corresponding to FIG. 5.

For specific implementations of the second clock source 804 and the second slave clock 805, refer to the description in the embodiment corresponding to FIG. 5.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and steps may be implemented by electronic hardware or a combination of computer software and electronic hardware. Whether the functions are performed by hardware or a combination of software and electronic hardware depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or in a form of electronic hardware and software.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a processor or a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method for exchanging a clock synchronization packet, comprising:
    determining, by a network apparatus, a first time deviation of a boundary clock (BC) of the network apparatus relative to a first clock source according to clock synchronization packets exchanged with the first clock source, wherein the BC avoids performing an operation of calibrating a time of a local clock of the BC according to the first time deviation; and
    sending, by the network apparatus, a first clock synchronization packet to a first slave clock of the BC, wherein the first clock synchronization packet comprises a first timestamp, a value of the first timestamp is equal to a first corrected value, and the first corrected value is a value obtained by the BC by correcting a time t1 of the local clock by using the first time deviation, wherein the time t1 is a time at which the BC generates the first timestamp.

2. The method according to claim 1, wherein before the sending, by the network apparatus, the clock synchronization packet to the first slave clock of the BC, the method further comprises:
    determining, by the network apparatus, a first frequency deviation of the BC relative to the first clock source according to the clock synchronization packet exchanged with the first clock source, wherein the BC avoids performing an operation of calibrating a frequency of the local clock of the BC according to the first frequency deviation, and the first corrected value is a value obtained by the BC by correcting t1 by using the first time deviation and the first frequency deviation.

3. The method according to claim 2, wherein the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the BC generates the first timestamp.

4. The method according to claim 1, wherein the method further comprises:
    determining, by the network apparatus, a second time deviation of the BC relative to a second clock source according to clock synchronization packets exchanged with the second clock source, wherein the BC avoids performing an operation of calibrating the time of the local clock of the BC according to the second time deviation; and
    sending, by the network apparatus, a second clock synchronization packet to a second slave clock of the BC, wherein the second clock synchronization packet comprises a second timestamp generated by the BC, a value of the second timestamp is equal to a second corrected value, and the second corrected value is a value obtained by correcting a time t2 of the local clock by using the second time deviation, wherein the time t2 is a time at which the BC generates the second timestamp.

5. The method according to claim 4, wherein before the sending, by the network apparatus, the clock synchronization packet to the second slave clock of the BC, the method further comprises:
    determining, by the network apparatus, a second frequency deviation of the BC relative to the second clock source according to the clock synchronization packet exchanged with the second clock source, wherein the BC avoids performing an operation of calibrating the frequency of the local clock of the BC according to the second frequency deviation, and the second corrected value is a value obtained by the BC by correcting t2 by using the second time deviation and the second frequency deviation.

6. The method according to claim 5, wherein the second corrected value is equal to a sum of t2, the second time deviation, and a second phase deviation, and the second phase deviation is a phase deviation that is of the local clock relative to the second clock source and that is caused by the second frequency deviation within duration from a time at which the local clock determines the second frequency deviation to the time at which the BC generates the second timestamp.

7. A network apparatus, comprising:
    a processor, configured to determine a first time deviation of a boundary clock (BC) of the network apparatus relative to the first clock source according to clock synchronization packets exchanged with the first clock source, wherein the BC avoids performing an operation of calibrating a time of a local clock of the BC according to the first time deviation; and
    a transceiver, configured to send a first clock synchronization packet to a first slave clock of the BC, wherein the first clock synchronization packet comprises a first timestamp generated by the BC, a value of the first timestamp is equal to a first corrected value, and the first corrected value is a value obtained by the BC by correcting a time t1 of the local clock by using the first time deviation, wherein the time t1 is a time at which the BC generates the first timestamp.

8. The network apparatus according to claim 7, wherein the processor is further configured to: before sending the clock synchronization packet to the first slave clock of the BC,
determine a first frequency deviation of the BC relative to the first clock source according to the clock synchronization packets exchanged with the first clock source, wherein the BC avoids performing an operation of calibrating a frequency of the local clock of the BC according to the first frequency deviation, and the first corrected value is a value obtained by the BC by correcting t1 by using the first time deviation and the first frequency deviation.

9. The network apparatus according to claim 7, wherein the processor is further configured to
determine a second time deviation of the BC relative to the second clock source according to clock synchronization packets exchanged with a second clock source, wherein the BC avoids performing an operation of calibrating the time of the local clock of the BC according to the second time deviation; and the transceiver is further configured to
send a second clock synchronization packet to a second slave clock of the BC, wherein the second clock synchronization packet comprises a second timestamp generated by the BC, a value of the second timestamp is equal to a second corrected value, and the second corrected value is a value obtained by correcting a time t2 of the local clock by using the second time deviation, wherein the time t2 is a time at which the BC generates the second timestamp.

10. The network apparatus according to claim 9, wherein the processor is further configured to: before sending the clock synchronization packet to the second slave clock of the BC,
determine a second frequency deviation of the BC relative to the second clock source according to the clock synchronization packets exchanged with the second clock source, wherein the BC avoids performing an operation of calibrating the frequency of the local clock of the BC according to the second frequency deviation, and the second corrected value is a value obtained by the BC by correcting t2 by using the second time deviation and the second frequency deviation.

11. A system, wherein comprising a first network device, and a second network device, wherein the first network device is a first clock source of the second network device, and the second network device comprises a boundary clock (BC), the second network device is configured to:
determine a first time deviation of the BC relative to the first clock source according to clock synchronization packets exchanged with the first clock source, wherein the BC avoids performing an operation of calibrating a time of a local clock of the BC according to the first time deviation; and
send a first clock synchronization packet to a first slave clock of the BC, wherein the first clock synchronization packet comprises a first timestamp, a value of the first timestamp is equal to a first corrected value, and the first corrected value is a value obtained by the BC by correcting a time t1 of the local clock by using the first time deviation, wherein the time t1 is a time at which the BC generates the first timestamp.

12. The system according to claim 11, wherein before sending the first clock synchronization packet, the second network device is further configured to:
determine a first frequency deviation of the BC relative to the first clock source according to the clock synchronization packets exchanged with the first clock source, wherein the BC avoids performing an operation of calibrating a frequency of the local clock of the BC according to the first frequency deviation, and the first corrected value is a value obtained by the BC by correcting t1 by using the first time deviation and the first frequency deviation.

13. The system according to claim 12, wherein the first corrected value is equal to a sum of t1, the first time deviation, and a first phase deviation, and the first phase deviation is a phase deviation that is of the local clock relative to the first clock source and that is caused by the first frequency deviation within duration from a time at which the local clock determines the first frequency deviation to the time at which the BC generates the first timestamp.

14. The system according to claim 11, wherein the second network device is further configured to:
determine a second time deviation of the BC relative to a second clock source according to clock synchronization packets exchanged with a second clock source, wherein the BC avoids performing an operation of calibrating the time of the local clock of the BC according to the second time deviation; and
send a second clock synchronization packet to a second slave clock of the BC, wherein the second clock synchronization packet comprises a second timestamp generated by the BC, a value of the second timestamp is equal to a second corrected value, and the second corrected value is a value obtained by correcting a time t2 of the local clock by using the second time deviation, wherein the time t2 is a time at which the BC generates the second timestamp.

15. The system according to claim 14, wherein before sending the second clock synchronization packet, the second network device is further configured to:
determine a second frequency deviation of the BC relative to the second clock source according to the clock synchronization packets exchanged with the second clock source, wherein the BC avoids performing an operation of calibrating the frequency of the local clock of the BC according to the second frequency deviation, and the second corrected value is a value obtained by the BC by correcting t2 by using the second time deviation and the second frequency deviation.

16. The system according to claim 15, wherein the second corrected value is equal to a sum of t2, the second time deviation, and a second phase deviation, and the second phase deviation is a phase deviation that is of the local clock relative to the second clock source and that is caused by the second frequency deviation within duration from a time at which the local clock determines the second frequency deviation to the time at which the BC generates the second timestamp.

17. The system according to claim 11, wherein the second network device is further configured to:
exchange the clock synchronization packets with the first clock source by using a first slave port of the BC.

18. The system according to claim 11, wherein the second network device is further configured to:

send the first clock synchronization packet to the first slave clock of the BC by using a first master port of the BC.

19. The system according to claim 14, wherein the second network device is further configured to:
exchanging the clock synchronization packets with the first clock source by using a second slave port of the BC.

20. The system according to claim 14, wherein the second network device is further configured to:
send the second clock synchronization packet to the second slave clock of the BC by using a second master port of the BC.

* * * * *